US007969439B2

(12) United States Patent
Mao et al.

(10) Patent No.: US 7,969,439 B2
(45) Date of Patent: Jun. 28, 2011

(54) METHOD AND APPARATUS FOR FAST FLICKER-FREE DISPLAYING OVERLAPPED SPARSE GRAPHS WITH OPTIONAL SHAPE

(75) Inventors: Shengyao Mao, Shenzhen (CN); Kefeng Liao, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 881 days.

(21) Appl. No.: 11/946,797

(22) Filed: Nov. 28, 2007

(65) Prior Publication Data

US 2008/0278519 A1 Nov. 13, 2008

(30) Foreign Application Priority Data

May 11, 2007 (CN) .......................... 2007 1 0108310

(51) Int. Cl.
*G06T 15/00* (2011.01)

(52) U.S. Cl. ........ 345/440; 345/629; 345/642; 345/647; 715/768; 715/807

(58) Field of Classification Search .................. 345/440, 345/629–642, 647; 715/768, 807
See application file for complete search history.

(56) References Cited

U.S. PATENT DOCUMENTS 5,293,470 A * 3/1994 Birch et al. ................... 345/634
5,347,624 A * 9/1994 Takanashi et al. ............ 345/641
5,463,728 A * 10/1995 Blahut et al. .................. 715/807
5,546,518 A * 8/1996 Blossom et al. .............. 345/473
5,651,107 A * 7/1997 Frank et al. .................... 715/768
5,757,380 A * 5/1998 Bardon et al. ................ 345/629
7,852,339 B2 * 12/2010 Buxton ......................... 345/501
7,864,197 B2 * 1/2011 Brown .......................... 345/629

FOREIGN PATENT DOCUMENTS

CN 1664865 9/2005
JP 2002-094775 3/2002
JP 2003-044865 2/2003
JP 2003-101759 4/2003

* cited by examiner

*Primary Examiner* — Phu Nguyen
(74) *Attorney, Agent, or Firm* — Kory D. Christensen; Stoel Rives LLP

(57) ABSTRACT

A method for converting graphic elements containing sparse graphs into graphic layers is described, comprising the steps of: correspondingly mapping respective sparse graphs to respective sparse graphic layers, and projecting sequentially from top to bottom the regular graphs between the sparse graphs into a projection plane to form a regular graphic composition layer. Also described is a method for fast flicker-free displaying overlapped sparse graphs with optional shape, comprising: converting graphic element containing sparse graphs to be displayed into graphic layers; deciding whether to plot or erase the sparse graph to be displayed, and, when the sparse graph is decided to be erased, setting various points on the corresponding sparse graph to be transparent; and completing the plotting of points of the sparse graph point by point based on the shape of the sparse graph to be displayed. Apparatuses corresponding to the above methods are also described.

17 Claims, 6 Drawing Sheets

| | |
|---|---|
| 1 | I |
| 2 | A |
| 3 | II + III |
| 4 | B |
| 5 | IV |

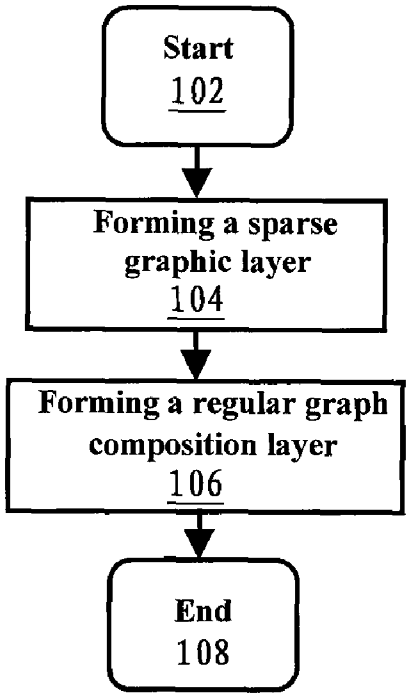
Fig.1
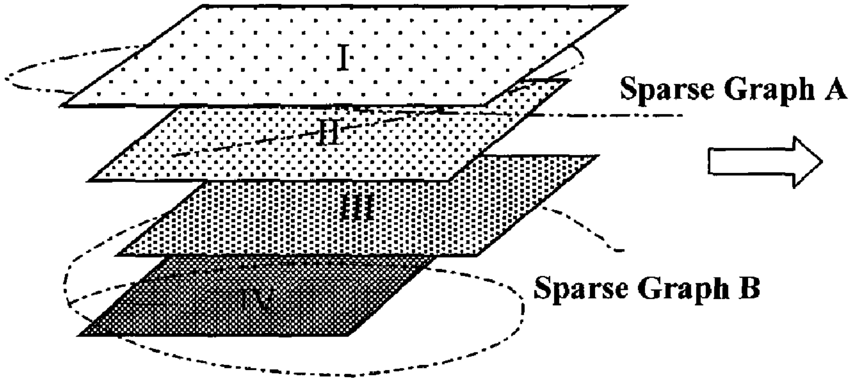
Fig 2a
| | |
|---|---|
| 1 | I |
| 2 | A |
| 3 | II + III |
| 4 | B |
| 5 | IV |
Fig 2b
Fig. 2

$$\begin{array}{cccc} X(0,0) & X(0,1) & \ldots & X(0,n) \\ X(1,0) & X(1,1) & \ldots & X(1,n) \\ \ldots & \ldots & \ldots & \ldots \\ X(m,0) & X(m,1) & \ldots & X(m,n) \end{array}$$

Fig. 3

$$(x_1, y_1) \quad (x_2, y_2) \quad \ldots \quad (x_n, y_n)$$

Fig. 4

METHOD AND APPARATUS FOR FAST FLICKER-FREE DISPLAYING OVERLAPPED SPARSE GRAPHS WITH OPTIONAL SHAPE

STATEMENT OF RELATED APPLICATION

The present application claims the benefit of priority of the Chinese Patent Application No. 200710108310.5, entitled "METHOD AND APPARATUS FOR FAST FLICKER-FREE DISPLAYING OVERLAPPED SPARSE GRAPHS WITH OPTIONAL SHAPE", filed on May 11, 2007, which is incorporated herein by reference in its entirety.

FIELD OF THE INVENTION

The present invention relates to the field of graphic display, and more particularly to a method and apparatus for fast flicker-free displaying overlapped sparse graphs with optional shape.

BACKGROUND OF THE INVENTION

A complex embedded system is characterized as involving numerous elements in the operating interface, among which are lots of irregularly shaped graphic elements. There exists a need to properly display these elements.

Currently there are mainly two solutions:

One is to arrange the graph layering in advance. Specifically, different image elements are first assigned to different graphic layers in accordance with circumstances. When they are converted to video signals for output, the content in each graphic layer is combined into a single pixel value (grayed or colored) and outputted to a display device. Mindray Co. has got a patent for this method, see the patent application No. 03113847.0, entitled "Method and Circuit for Real-Time Waveform Smooth Scroll and Background Image superposition display", by Mu Lemin.

Another method is that all graphic elements are directed from top to bottom to the same graphic layer instead of being grouped into different layers. However, when the content of one of the sparse graphs is changed, all of the superposed parts of the sparse graph have to be re-plotted from top to bottom.

The method of arranging graphic layers in advance may solve the flickering problem, but the biggest problem with this method is that the system using this method provides poor flexibility. When display requirements (e.g., upper and lower layout) are changed, it is required to rearrange and redesign the display. Though the flexibility may be improved by means of software, the display speed will be rather slow, and it is difficult to achieve a faster refresh rate for display (i.e., lower frame rate) in common embedded systems. Satisfactory visual effect can be achieved only if the graph layering is implemented by means of hardware, but this will increase manufacture and maintenance cost.

Redrawing an overlapped sparse graph may be conveniently implemented by means of software. However, this method needs to deal with the conflict between display effect and display speed. Since all of the sparse graphs on the sparse graph to be refreshed have to be refreshed, flicker is caused with regard to the display effect, which cannot be avoided even if a fast refresh rate of the video memory is used. One of the common anti-flicker measures is a dual buffer scheme, according to which the plotting is first finished in a memory and then directly on the screen. However, this will increase the time for plotting, thus causing the response performance of the embedded system to decrease.

SUMMARY OF THE INVENTION

An object of the present invention is to provide an alternative method and apparatus that has both advantages of the above-mentioned two methods and overcome respective disadvantages.

According to an aspect of the present invention, a method for converting graphic elements containing sparse graphs into graphic layers is described, comprising the steps of: mapping the sparse graphs to respective sparse graphic layers correspondingly; and projecting sequentially from top to bottom regular graphs between the sparse graphs into a projection plane to form a regular graph composition layer.

The present invention also provides a layering apparatus for converting graphic elements containing sparse graphs into graphic layers, comprising: a module for mapping the sparse graphs to respective sparse graphic layers correspondingly; and a module for projecting sequentially from top to bottom the regular graphs between the sparse graphs into a projection plane to form a regular graph composition layer.

According to another aspect of the present invention, a method for fast flicker-free displaying overlapped sparse graph with optional shape is also described, comprising the steps of: converting graphic elements containing sparse graphs to be displayed to graphic layers, i.e., correspondingly mapping the sparse graphs to respective sparse graphic layers, and projecting sequentially from top to bottom the regular graphs between the sparse graphs into a projection plane to form a regular graphic composition layer; deciding whether to plot or erase the sparse graph to be displayed, and, when the sparse graph is decided to be erased, setting various points on the corresponding sparse graph to be transparent; and plotting one by one the points of the sparse graph based on the shape of the sparse graph to be displayed.

An apparatus for fast flicker-free displaying overlapped sparse graph with optional shape is also described, comprising a layering module for converting graphic elements containing sparse graphs to be displayed into graphic layers, i.e., correspondingly mapping the sparse graphs to respective sparse graphic layers, and projecting sequentially from top to bottom the regular graphs between the sparse graphs into a projection plane to form a regular graphic composition layer; a decision making module for deciding whether to plot or erase the sparse graph to be displayed, and, when the sparse graph is decided to be erased, setting various points on the corresponding sparse graph to be transparent; and a plotting module for completing the plotting of the points of the sparse graph point by point based on the shape of the sparse graph to be displayed.

The method and apparatus proposed in the present invention have following features:

1) flicker-free, the plotting (or erasing) of sparse graphs will not result in the redrawing of other regular rectangle windows and sparse graphs;

2) fast-implemented, minimum amount of plotting is required, because only visible points are plotted, excluding invisible points and the points that do not exist, thereby reducing "overhead" for plotting, which is also true with regard to erasing;

3) applicable under any complexity level, this method is subjected to no limitation on the superposition layer between the sparse graphs and regular graphic element (rectangle), or the number of the overlapped sparse graphs; and remains applicable and effective when changes occur to the number and the hierarchical layout of the sparse graphs and regular graphs either during design or execution;

4) less occupied resources, it demands no expensive special-purpose video memory or video processor, or any special superposition control.

BRIEF DESCRIPTION OF THE DRAWINGS

FIG. 1 illustrates a layering method for converting graphic elements containing sparse graphs into graph layers;

FIG. 2 illustrates an example of the method for converting the graphic elements containing sparse graphs to graphic layers according to the method of FIG. 1, among which FIG. 2*a* shows graphic elements containing sparse graphs, and FIG. 2*b* shows graphic layers upon conversion;

FIG. 3 illustrates a matrix representation of the graphic layer;

FIG. 4 illustrates a sequence of points of the graphic layer;

DETAILED DESCRIPTION OF THE INVENTION

Figure 5:
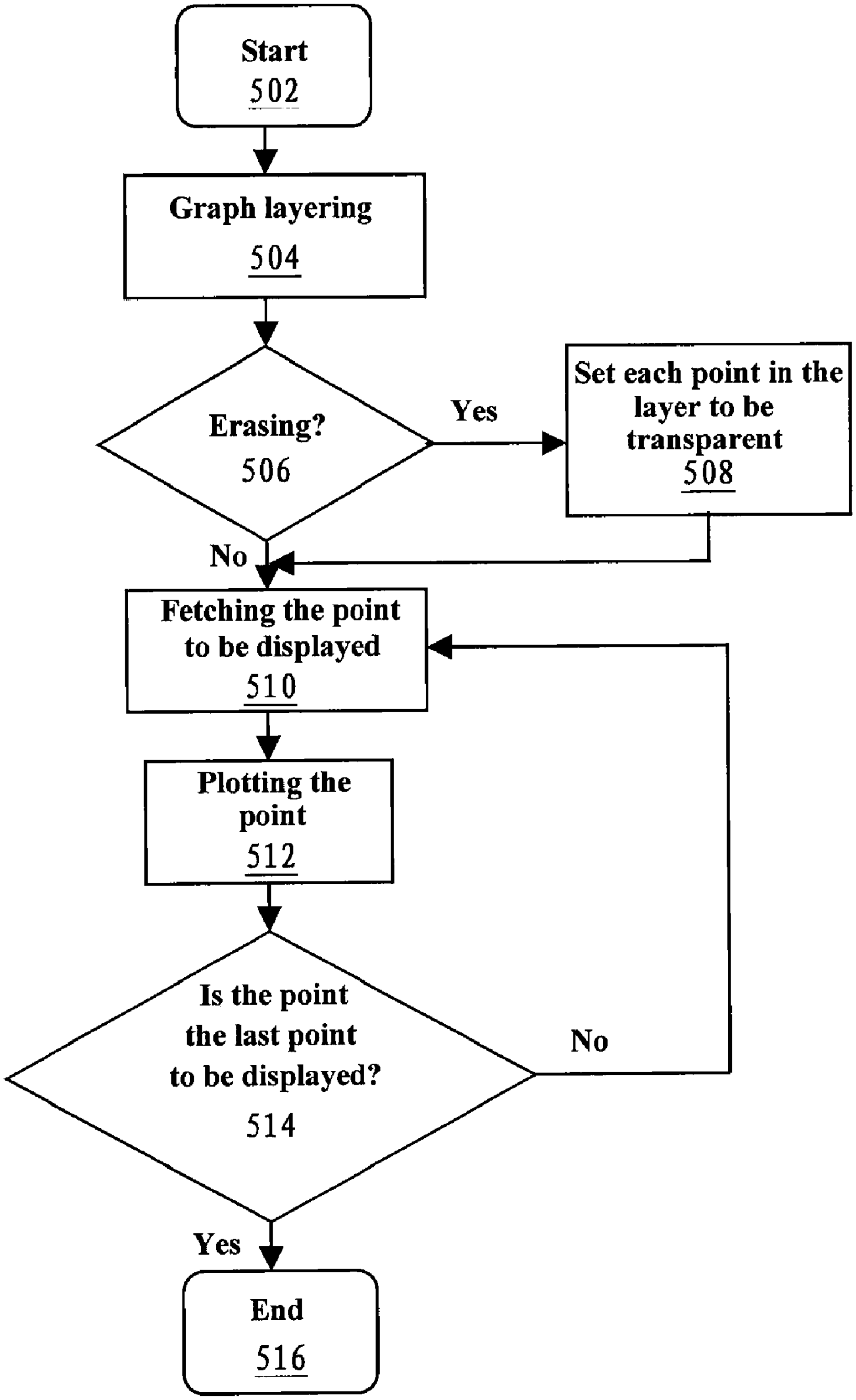
FIG. 5 is a flow chart showing a complete process of graph display.

The method and apparatus of the present invention will be described in greater details by means of embodiments with reference to the accompanying drawings.

FIG. 1 illustrates a layering method for converting graphic elements containing sparse graphs into graph layers. The process starts in step 102. The sparse graphs are correspondingly mapped to form respective sparse graphic layers in step 104. In addition to the sparse graphic layers, the regular graphs are also formed into a composition layer in step 106. Specific to step 106, the regular graphs between the sparse graphs are projected sequentially from top to bottom into a projection plane. The sequence "from top to bottom" is relatively herein. Through step 104 and step 106, the layering of numerous graphic elements is completed. It should be appreciated that the order of step 104 and step 106 may be interchanged, that is, the layering method may be implemented by forming a regular graph composition layer before forming a sparse graphic layer. Furthermore, the above-mentioned projection step may be implemented using various projection methods that are well known to those skilled in the art.

FIG. 2 illustrates an example of converting the graphic elements containing sparse graphs (as shown in FIG. 2*a*) into graphic layers (as shown in FIG. 2*b*) according to the method of FIG. 1. In the graphic elements shown in FIG. 2*a*, dotted lines A and B indicate sparse graphs, and I-IV indicate regular graphic windows. FIG. 2*b* is a graphic layer model after conversion, wherein numerals 1-5 indicate graphic layers. The model has a tower-shaped structure composed of a series of graphic layers overlapped with each other. Each of the regular graph composition layers is composed of only the regular rectangular window(s) between two adjacent sparse graphic layers, and each sparse graph forms a graphic layer. Therefore, graphic layers include two categories. One includes sparse graphic layers formed from sparse graphs, and the other includes regular graph composition layers formed by projection of the regular graph(s) between sparse graphs. As shown in the figure, sparse graphs A and B form the second and fourth graphic layers respectively; regular windows I and IV form the first and fifth graphic layers respectively; and the regular windows II and III between sparse graphs A and B are sequentially projected from top to bottom so as to form the third graphic layer. According to the embodiment of present invention, the second and fourth layers are sparse graphic layers, while the first, third and fifth layers are regular graph composition layers.

The sparse graphic layer may be represented by a matrix. The number of rows of the matrix represents the number of pixels of the display device in the height direction, and the number of columns of the matrix represents the number of pixels of the display device in the width direction. The value of each matrix element contains information about the number of points and the color value of the pixel at the corresponding matrix position. The color values of various pixels in all sparse graphic layers may be identical or different.

The regular graph composition layer may also be represented by a matrix. The number of rows and columns of the matrix has the same indication as in the sparse graphic layers, but the value of each matrix element represents the color value of the pixel at the corresponding matrix position.

In an embodiment, various graphic layers (including the sparse graphic layers and the regular graph composition layers) may be presented as the matrix shown in FIG. 3. X(m,n) represents a point having the row and column coordinate (m,n) in the row and column plane, implying information including the color value, the number of points at that position, etc. Sparse graphs may be also presented as a sequence of points, as shown in FIG. 4. Each point $(x_n,y_n)$ indicates that there exists a visible point at the coordinate of the display device corresponding to that point, the value of point $(x_n,y_n)$ representing the number of points.

When changes happen to the sparse graphs, the information about the sparse graphic layers are automatically updated. The information updating is realized as follows: when a point is added, the coordinate of that point is added in the sequence of points. Therefore, the X value of this coordinate in the graphic layer is incremented to indicate addition of a new point at this coordinate. On the contrary, when a point is removed, the coordinate of that point is cancelled from the sequence of points. Therefore, the X value of this coordinate in the determinant is decremented to indicate that a point is removed at this coordinate.

All graphic layers above a sparse graph are a mask graphic layer of that sparse graph, while all graphic layers thereunder are a background graphic layer of that sparse graph. Referring to FIG. 2, the mask graphic layer of sparse graph A is layer 1, and the background graphic layers are layers 3, 4 and 5. As to sparse graph B, the mask graphic layers are layers 1, 2 and 3, and the background graphic layer is layer 5.

A mask graphic layer produces a shadowy effect. That is, when a point is plotted or erased, only when a point in the mask graphic layer corresponding to the coordinate of the point to be plotted or erased is transparent, will the point be effectively plotted or erased. A background graphic layer is useful for recovering the background. Specifically, when a point is erased, if the point in the background graphic layer corresponding to the coordinate of the point to be erased is not transparent, the color at that point is used for background recovery. Whereby, the number of traversals may be reduced, enhancing the plotting or erasing speed.

The embodiment of present invention utilizes a specific color coding to represent "transparent", which indicates no shadowy effect. The erasing process may be switched to the plotting process by simply setting the corresponding point in the sparse graphic layer to be erased as "transparent".

FIG. 5 shows a flow chart of a complete graph display. Graph display begins in step 502. Graph layering is first performed in step 504, and then in step 506, it is decided whether a plotting or erasing is performed on the sparse graph. In case of plotting, step 510 starts. In case of an erasing instruction, each point in the layer to be erased is set transparent in step 508 and then starts step 510, where the point position to be displayed is fetched, and then plotted in step 512. In the subsequent step 514, it is decided whether or not the plotted point is the last point in the sparse graph to be displayed. If not, step 510 is executed to fetch a next point to be displayed; if yes, the image display process ends.

Step 510 for fetching the point to be displayed is to obtain the coordinate of the point to be plotted one by one based on the shape of the sparse graph that is defined by the sequence of points.

Figure 6:
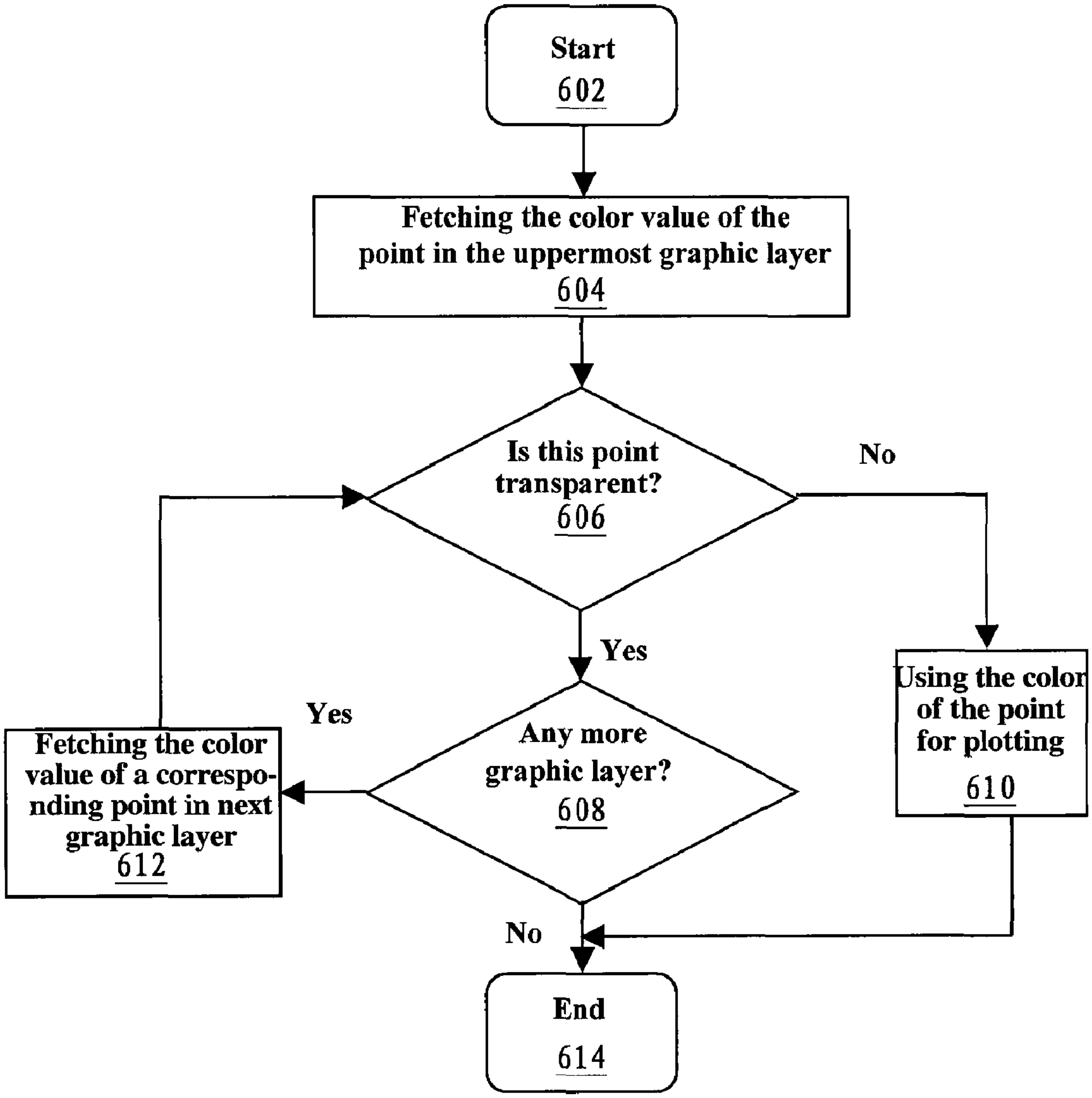
FIG. 6 illustrates a detailed process of FIG. 5 for plotting a particular point.

FIG. 6 illustrates the detailed step for plotting a point (i.e., step 512 in FIG. 5). The flow begins in step 602. Step 604 then fetches the color value of the point in the uppermost graphic layer, and then in step 606, a decision is made as to whether said point is transparent. If said point is not transparent, step 610 is executed, where the color of said point is used to complete the plotting of the point (i.e., step 614); if this point is transparent, step 608 is executed to decide whether there is any other graphic layer. If there is no graphic layer, the plotting of this point is completed in step 614; if there is any other graphic layer, the color value of the position in the next graphic layer corresponding to said point is fetched in step 612. Thereafter, the process returns to step 606 for deciding whether the point is transparent, and the cycle repeats until the plotting of this point is completed at step 614.

Figure 7:
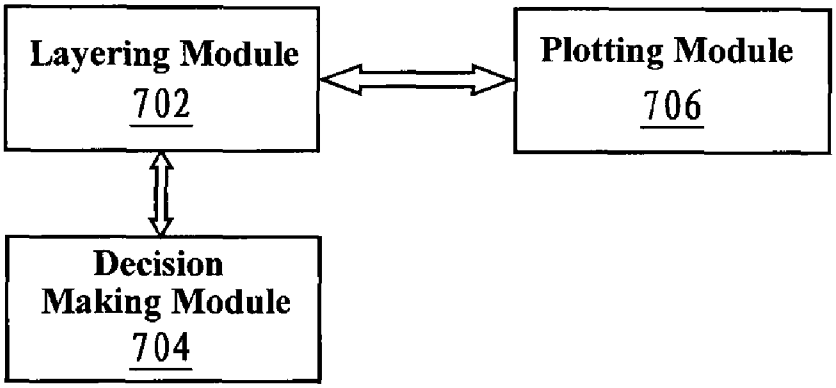
FIG. 7 is an apparatus for displaying a sparse graph according to the embodiment of present invention.

FIG. 7 illustrates an apparatus for displaying a sparse graph according to the embodiment of present invention, comprising a layering module 702, a decision making module 704 and a plotting module 706. The layering module 702 is used to convert the graphic elements containing sparse graphs to be displayed into graphic layers. Specifically, various sparse graphs are correspondingly mapped into respective sparse graphic layers, and the regular graphs between the sparse graphs are projected sequentially from top to bottom into a projection plane to form a regular graphic composition layer. The decision making module 704 decides whether to plot or erase the sparse graph to be displayed, and, when the sparse graph is to be erased, sets various points in the corresponding sparse graph as transparent. The plotting module 706 is used to complete the plotting of points of the sparse graph point by point based on the shape of the sparse graph to be displayed.

Figure 8:
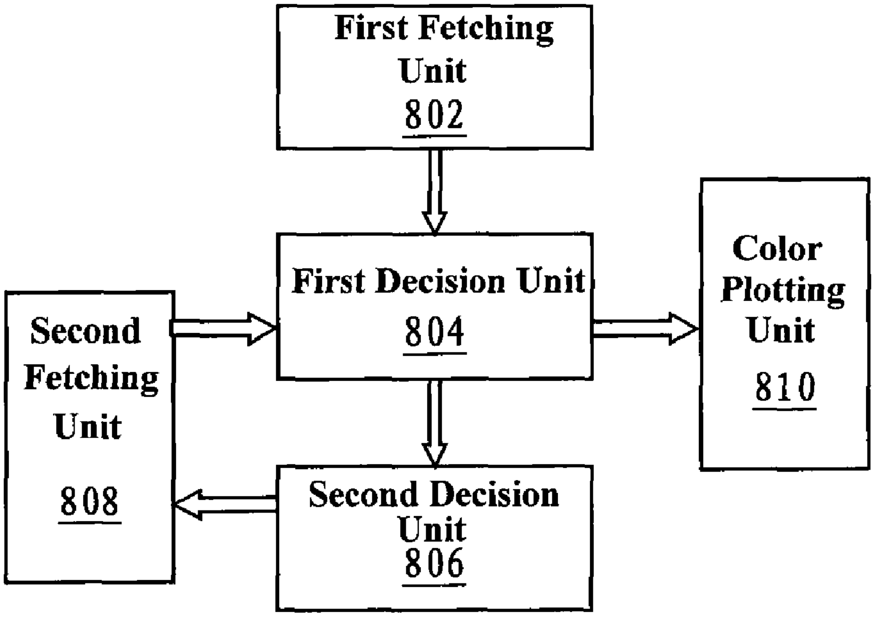
FIG. 8 illustrates a structure of the plotting module shown in FIG. 7.

FIG. 8 further illustrates the structure of the plotting module, comprising: a first fetching unit 802 for fetching the color value of a point in the uppermost graphic layer; a second fetching unit 808 for fetching the color value at the position in next graphic layer corresponding to the point in the uppermost graphic layer; a first decision making unit 804 for deciding whether said point is transparent; a second decision making unit 806 for deciding whether there is any other graphic layer; and a color plotting unit 810. When the first decision making unit 804 decides that a point is not transparent, the color plotting unit 810 uses the color of this point to complete the plotting of this point. When it is transparent, the second decision making unit 806 decides whether there is any other graphic layer. If there is not any other graphic layer, the plotting of this point is then completed, and if there is any other graphic layer, the second fetching unit 808 fetches the color value of the position in a next graphic layer corresponding to said point. Subsequently, the first decision making unit 804 again decides whether the point is transparent. The cycle repeats until the plotting of this point is completed.

Figure 9:
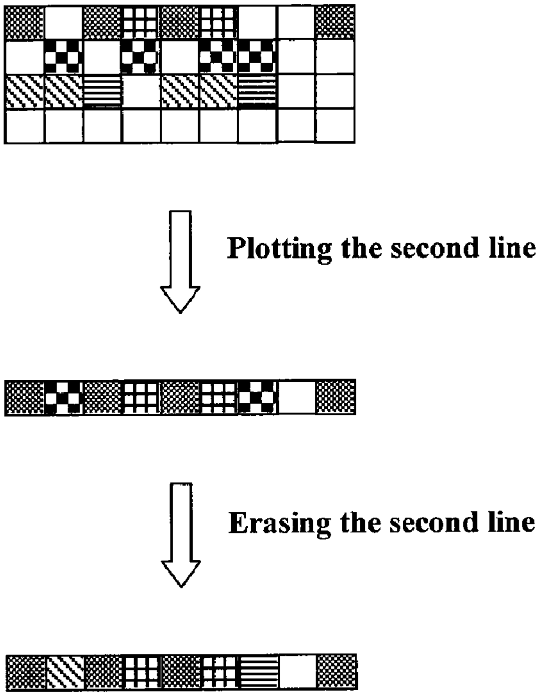
FIG. 9 illustrates an example of erasing or plotting a sparse graph.

FIG. 9 shows an example of erasing or plotting a sparse graph. The upper view shows a sectional view (X or Y direction) of a graphic layer model, the middle and the lower views show a row or a column in a graphic output device. Assuming that the second layer of the graphic layer model is a sparse graph, the blank box indicates a transparent point, and the other non-blank boxes represent the points with different color values in the graphic layer. The plotting process is similar to the erasing process, with the only difference in that in the erasing process, the corresponding point in the sparse graphic layer to be erased is required to be set as "transparent", and then the plotting is performed point by point.

Figure 10:
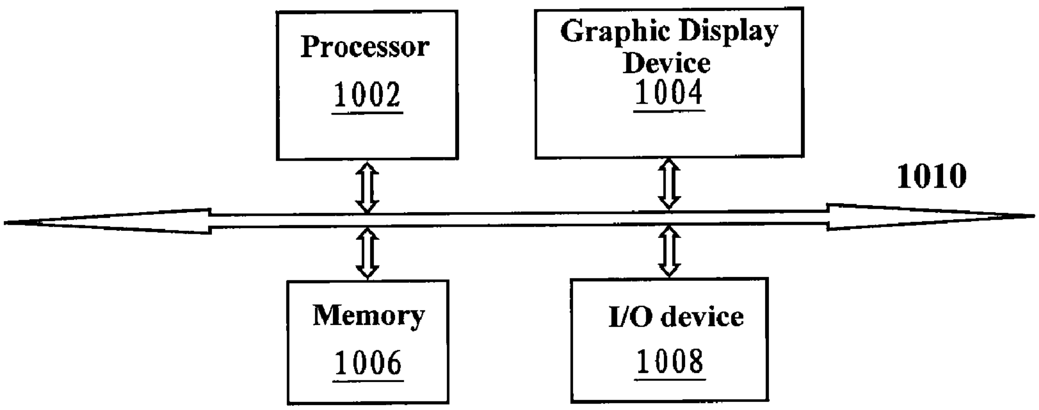
FIG. 10 illustrates a processor-based apparatus for realizing the embodiment of present invention.

FIG. 10 illustrates a processor-based apparatus according to the embodiment of present invention, which may accomplish a fast flicker-free display of overlapped sparse graphs with optional shape according to the above-described method, so as to realize the objects of the present invention. As shown in the figure, the apparatus generally comprises a processor 1002, a graph display device 1004, a memory 1006, an I/O device 1008 and a bus 1010, etc. Various units as above described of the apparatus communicate with each other via the bus 1010. For example, the processor 1002 may have an access to the data (e.g., computer codes implemented according the above method) from the memory via the bus 101. The processor 1002 may be a graphic processor GPU, a microprocessor, etc. The memory may be a random access memory (RAM), or a removable memory, such as hard disk, optical disk, flash, etc., any of which may store the soft code for implementing the above method. The I/O device 1008 is an output and input interface. The graphic display device 1004 displays the plotted sparse graphs, which may be CRT, LCD or printers, etc.

The present invention is described above with reference to specific embodiments. The present invention may be applied to embedded systems as well as all of those non-embedded computer systems (including desktop computer, server, etc.). It should be appreciated that the particular embodiments described above are illustrative rather than restrictive, and the protected scope of the present invention is defined by the appended claims.

The invention claimed is:

1. A computer-implemented method for displaying an image comprising a plurality of graphic elements on a display device, comprising:

receiving a plurality of graphic elements to be displayed on a display device;

identifying a sparse graphic element among the plurality of graphic elements;

mapping the sparse graphic element to a sparse graphic layer;

forming at least one regular graphic composition layer comprising a plurality of remaining graphic elements; and projecting sequentially the sparse graph layer and the at least one regular graphic composition layer to form an image to be displayed on a display device.

2. The method according to claim 1, wherein the sparse graphic layer is represented by a matrix comprising a plurality of coordinates at which a corresponding plurality of visible points are located.

3. The method of claim 2, wherein the sequence of points further comprises a color value.

4. The method according to claim 1, wherein the regular graphic composition layer is represented by a matrix, of which the number of rows represents the number of pixels of a display device in a height direction, the number of columns represents the number of pixels of the display device in a width direction, and the value of each matrix element representing a color value at a corresponding matrix position.

5. The method of claim 1, further comprising:

identifying at least two graphic elements in adjacent layers;

forming a regular graphic composition layer comprising the at least two graphic elements in adjacent layers.

6. A layering apparatus for generating an image comprising a plurality of graphic elements on a display device, comprising:

a processor; and a computer-readable storage medium in communication with the processor, comprising:

a layering module executable on the processor for receiving a plurality of graphic elements to be displayed on a display device, for identifying a sparse graphic element among the plurality of graphic elements, and for mapping the sparse graphs to a sparse graphic layer; and a projecting module executable on the processor for projecting the sparse graph layer and the at least one regular graphic composition layer to form an image to be displayed on a display device.

7. The apparatus according to claim 6, wherein the sparse graphic layer is represented by a matrix comprising a plurality of coordinates at which a corresponding plurality of visible points are located.

8. The apparatus according to claim 6, wherein the regular graphic composition layer is represented by a matrix, of which the number of rows represents the number of pixels of a display device in a height direction, the number of columns represents the number of pixels of the display device in a width direction, and the value of each matrix element representing a color value at a corresponding matrix position.

9. A computer-implemented method for displaying an image comprising a plurality of graphic elements on a display device, comprising:

receiving a plurality of graphic elements to be displayed on a display device;

identifying a plurality of sparse graphic elements among the plurality of graphic elements;

converting the sparse graphic elements into a corresponding plurality of sparse graphic layers;

forming at least one regular graphic composition layer comprising a plurality of remaining graphic elements;

projecting sequentially the sparse graphic layer and the at least one regular graphic composition layer to form an image to be displayed on a display device;

determining an uppermost graphic layer from among the at least one regular graphic composition layer and the plurality of sparse graphic layers;

plotting a plurality of visible points from the uppermost graphic layer;

determining a plurality of points in the uppermost graphic layer that are transparent; and plotting a plurality of points in a lower graphic layer corresponding to the plurality of points in the uppermost graphic layer that are transparent.

10. The method according to claim 9, wherein the sparse graphic layer is represented by a sequence of points corresponding to a visible point at the coordinate of a display device corresponding to said point in the graphic layer.

11. The method according to claim 9, wherein the sparse graphic layer is represented by a matrix, of which the number of rows represents the number of pixels of a display device in a height direction, the number of columns represents the number of pixels of the display device in a width direction, and the value of each matrix element comprises a color value at the corresponding matrix position.

12. The method according to claim 9, wherein the regular graphic composition layer is represented by a matrix comprising a plurality of coordinates at which a corresponding plurality of visible points are located.

13. The method of claim 12, wherein the sparse graphic layer is represented as a sequence of points at which a point of the sparse graphic element is located.

14. An apparatus for generating an image comprising a plurality of graphic elements on a display device, comprising:

a processor; and a computer-readable storage medium, comprising:

a layering module executable on the processor for receiving a plurality of graphic elements to be displayed on a display device and mapping the sparse graphs to a sparse graphic layer, and projecting sequentially the sparse graph layer and the at least one regular graphic composition layer to form an image to be displayed on a display device;

a decision making module executable on the processor for determining points of the sparse graph to be displayed in the image; and a plotting module executable on the processor for plotting of the points of the sparse graph to be displayed.

15. The apparatus according to claim 14, wherein the plotting module further comprises:

a first fetching unit for fetching the color value of a first point in the uppermost graphic layer;

a second fetching unit for fetching the color value of a second point in a lower graphic layer corresponding to the point in the uppermost graphic layer;

a first decision making unit for deciding whether the point in the uppermost graphic layer is transparent; and a color plotting unit;

wherein, when the first decision making unit decides that the point is not transparent, the color plotting unit uses the color of said point to complete the plotting of said point, and wherein, when the first decision making unit decides that the point is transparent, the second fetching unit fetches the color value of the second point.

16. The apparatus according to claim 14, wherein the sparse graphic layer is represented by a sequence of points in which each point indicates that there exists a visible point at a specified coordinate of the display device.

17. The apparatus according to claim 14, wherein the regular graphic composition layer may be represented by a matrix comprising a plurality of coordinates at which a corresponding plurality of visible points are located.

* * * * *